United States Patent Office 3,317,402
Patented May 2, 1967

3,317,402
GRAIN MODIFICATION PROCESS AND PRODUCT
Leslie F. Smith, Robert V. Dahlstrom, James H. Jaehnig, and Michael R. Sfat, Manitowoc, Wis., assignors to Rahr Bio-Technical Laboratories, Incorporated, Manitowoc, Wis., a corporation of Wisconsin
No Drawing. Filed June 11, 1963, Ser. No. 286,936
23 Claims. (Cl. 195—69)

This invention relates to a new grain modification process and to a new grain product which may be produced thereby. More particularly, the invention relates to a process for modification of a cereal grain, which produces a product having a desired enzyme content, and to such product.

Grain modification is a physiological process of enzymatic development and hydrolysis within the grain. Cereal grains classically have been modified by germination, to develop the complete enzyme system and partially hydrolyze the reserve food materials in the grain. This modification process is known as malting, and the product is termed malt. Malt is used in the production of fermented beverages and distilled spirits, and it serves as a valuable human and animal foodstuff.

Grain modification has long been studied, and numerous proposals for improvement have been made. These proposals have included many designed to alter the course of germination in some manner, in order to reduce losses due to root formation and respiration, and to increase operating efficiency. In recent years, it has been learned that gibberellic acid compounds (gibberellin $A_3$) can stimulate grain modification. It was further found that grain may be acidified to inhibit root growth, and treated with gibberellic acid and germinated to effect modification of the grain, as shown in U.S. Patent No. 3,085,945.

It has now been discovered in accordance with the present invention that the embryonic radicles and acrospires of grain may be rendered inviable, so that the embryos are dead, whereby germination and its attendant losses and disadvantages are eliminated, and the grain having dead embryos may be modified, especially by treatment with a gibberellic acid compound. A new grain product is produced, having inviable embryonic radicle and acrospire structures while having a desired enzyme content not naturally present in grain. Inasmuch as germination does not take place, the new grain modification process is distinct from the malting process, and the new modified grain product is distinct from malt. However, the new product contains enzymes and other values comparable to those contained in malt.

The invention now enables the production of modified grain without the characteristic losses and operating problems attending germination in malting, and other advantages are achieved. While various processes have been provided in the past for reducing losses owing to germination during malting and minimizing attendant operating problems, the embryos remained viable and germination continued, so that such losses and problems were not eliminated. In the invention, the inviability of the radicles and the acrospires results in the elimination of the respiratory losses previously occasioned by their germination. The problems of controlling the development of rootlets and acrospires no longer exist. The various operating problems and requirements attending rootlet and acrospire growth are obviated, including the physical handling, space requirements, and control of the processing medium which are occasioned by such growth. The invention also enables the production of modified grain from raw grain of varying quality, since the germination capacity of the embryo is no longer a factor.

The new grain product resulting from modification, having inviable or dead embryonic radicles and acrospires, is composed of small, dense, compact grains. Owing to the lack of radicle and acrospire growth, the grains retain less moisture and require less kiln capacity. The elimination of viability is no longer a factor in kilning. The dried grain product likewise is composed of small, dense, compact grains with tightly adherent husks, and very little culms separate in cleaning. The product has a high bushel weight.

The invention finds important application in the modification of the malting cereal grains, preferably barley, wheat, oats, and rye. The modification process may commence with the matured whole grain, in the condition in which it is received from storage after harvesting. In the case of barley, for example, the husk-containing varieties may be treated with the husk intact. Use of the husk-containing varieties and retention of the husks is especially advantageous in the modification of barley which is intended for use in brewing, inasmuch as the husks contribute importantly to the production of a suitable wort. The invention is also applicable to the huskless varieties of barley and to the other cereal grains, in the whole grain condition in which they are normally received following harvesting. In addition, dehusked grain may be employed in the invention.

Conventional malting practice involves the use of matured grain which exhibits a high degree of germination, corresponding to a high viable grain embryo content. In the new process, however, the viability of the embryo portion of the grain is not a significant factor, so that matured grain of diverse quality may be employed. At the same time, it is necessary that the endosperm portion of the grain be active or capable of modification. It is preferred that the grain have a high proportion of active endosperm, and it is further preferred that the endosperm of at least about 95% of the grain be active. The activity can be determined readily by testing samples of the grain under enzyme-producing conditions, such as described herein.

The grain available with the foregoing endosperm activity commonly will have a viable embryonic radicle and acrospire content as well, which will vary with the quality of the grain. Consequently, an important preferred embodiment of the invention involves treating grain having such viable embryo content to render the radicles and acrospires inviable, and modifying the thus-treated grain. In another embodiment, grain lacking in viable embryo content while having an active endosperm content, e.g., damaged grain, may be modified in accordance with the invention.

The grain whole corns, preferably in the whole grain condition, may be treated to render the embryonic acrospires and radicles inviable according to a preferred method as described hereinafter, and it is also contemplated that other methods may be employed which accomplish this object. The accomplishment of this object is readily determinable, by subjecting the grain to germinating conditions and observing the results: under no conditions will the radicles and acrospires grow when the embryos are dead. There is no emergence of the radicle by rupture of the coleorhiza, and no emergence of the acrospire beyond the scutellar boundary, both remaining in their embryonic physical states.

The endosperm is susceptible to impairment of its capacity for modification, which appears to be a function of the activity of the aleurone layer. The grain therefore is treated in a manner which will maintain a minimum capacity for modification. One measure of the capacity of the endosperm is its ability to produce the enzyme alpha-amylase. The preferred minimum alpha-amylase. The preferred minimum alpha-amylase content of the modification product is 15 dextrinizing units (D.U.) per gram on a dry basis, for brewing and other purposes. It is also preferred for brewing purposes that a minimum diastatic power of 40° Lintner per gram, dry basis, be obtained which is a function of the content of the enzymes alpha-amylase and beta-amylase. This latter condition is of lesser importance in applications other than brewing and distilling. (Analytical methods described herein and the units of measurement are those of the American Society of Brewing Chemists, described in A.S.B.C. Methods of Analysis, 6th edition, 1958.)

In proceeding according to a presently preferred embodiment of the invention, grain is treated in a moist condition to render the radicles and acrospires inviable. The grain preferably is steeped in water before the treatment to provide the desired moisture content while the radicles and acrospires remain in their embryonic states. The steeping preferably is sufficient to produce a moisture content of about 30 to 45%, preferably 36 to 43% by weight. It is generally preferred to steep for about 10 to 40 hours at temperatures in the range of about 45 to 75° F. to provide the foregoing moisture content, with the shorter times applying especially to oats and huskless grain.

A preferred treatment involves subjecting the moist grain to freezing temperature conditions sufficient to render the radicles and acrospires inviable. Temperatures substantially below the normal freezing point of water are preferred. Temperatures on the order of 0° F. and minimum times at such temperatures of about 2 hours, preferably 8 hours, have been found to be effective in treating barley whole grain, and other combinations of time and temperature may be employed. Maximum surface exposure of the grain under the treatment conditions is desirable. There appears to be no advantage in extending the treatment beyond the required minimum times. The grain endosperm exhibits good tolerance to this treatment; however, it is preferred to employ conditions of minimum severity to retain a maximum of endosperm activity.

The grain treated to render the embryonic radicles and acrospires inviable, or grain initially lacking in viable embryo content, is subjected to enzyme-producing conditions, for modification of the grain. In a preferred embodiment of the invention, the grain is contacted with an added compound of gibberellic acid under such conditions. In this manner, the above-described minimum production of alpha-amylase may be achieved in certain of the grains, such as barley and wheat. It has been found that such minimum production may be achieved in rye without added gibberellic acid compound. Addition of the compound to rye remains preferable, inasmuch as a substantial increase in the production of alpha-amylase is achieved thereby.

Gibberellic acid compounds are preferably employed which are soluble or dispersible in water in the desired concentrations. Such compounds include, for example, gibberellic acid, and its alkali metal and akaline earth metal salts, for example, the potassium, sodium, and calcium salts. The acid and the sodium and potassium salts are commercially available and therefore preferably employed. Other equivalent gibberellic acid compounds are well known, being described in U.S. Patent No. 2,842,051, for example, including the esters of the carboxyl and hydroxyl groups, such as the alkyl and acyl derivatives.

An amount of gibberellic acid compound is employed which is sufficient to stimulate increased enzyme production, preferably producing at least about 15 units of alpha-amylase per gram of grain modification product, on a dry basis. Similarly, as described above, the endosperm activity of the grain at the time it is subjected to enzyme-producing conditions preferably is sufficient to provide such minimum alpha-amylase content in the modified grain. It is also preferred that the several conditions provide a product having a minimum diastatic power of 40° Lintner. The gibberellic acid compound preferably is added in an amount which will provide a concentration on the grain at the start of modification of about 0.1 to 100 parts per million, further preferably 0.25 to 20 p.p.m., based on the dry weight of the initial grain.

The gibberellic acid compound may be applied to the grain before, during, or after the treatment affecting the embryo, so long as an effective quantity remains in contact with the grain. It is applied in a convenient manner which will insure absorption of the compound by the grain. The gibberellic acid compound preferably is applied to the grain in aqueous medium, in solution or dispersion, in a concentration in a range of about 0.1 to 100 parts per million, further preferably about 0.5 to 20 parts per million of the compound. The grain may be immersed or steeped in an aqueous medium containing the compound, or it may be sprayed with an aqueous composition of the compound. For economic reasons, the compound preferably is added after steeping to impart the desired moisture content, and after the embryo treatment step.

Prior to modification, the grain is caused to absorb moisture, which may be provided by the above steeping operation. Water may be added at the beginning of and during modification. It is generally preferred that the moisture content of the grain be in the range of about 35 to 50%, further preferably 38 to 47% by weight at the start of and during modification.

The treated grain is subjected to enzyme-producing conditions, which may be comparable to the germination conditions employed in malting. Thus, the conditions of time, temperature, humidity, and aeration may be the same as or similar to malting conditions. However, the absence of germination eliminates the conditions imposed thereby, and greater flexibility is imparted to the process, enabling the use of more favorable conditions. Also, the optimum conditions may vary depending upon the specific treatment employed to render the radicles and acrospires inviable. It is in general preferred to incubate the grain for about three to seven days at a temperature in the range of about 50 to 75° F. The higher incubation temperatures in the range of 60–75° F. are presently preferred. During the incubation period, the grain preferably is aerated by exposure to circulating air substantially saturated with moisture. The desired moisture content is maintained by additions of water when necessary.

The conditions for modification and the extent of modification may be varied depending upon the type of product desired. For example, when the product is intended for use in the manufacture of distilled spirits, as presently practiced employing distillers malt, the conditions are selected to produce a high alpha-amylase content in the product. When the product is to be used in the manner of brewers malt for producing a fermented beverage, the conditions are selected to provide a high extract yield.

Following modification to the desired extent, the product is dried to reduce the moisture content preferably to within about 5% by weight. The specific treatment depends upon the intended use of the product. Since germination does not take place, it is no longer necessary to arrest germination by kilning. However, the kilning practices which are conventional for manufacturing malt may be employed for reducing the moisture and curing to impart desirable flavor, color, and aroma. After kilning, the dry product is cleaned. Since no root or acrospire growth takes place, only a very small amount of material consisting mostly of detached husks is separated from the product. The product is then stored for subsequent use in the intended manner, which may be as a starting material in the production of fermented beverages and distilled spirits.

The new grain product constitutes modified malting cereal grain whole corns having inviable embryonic radicles and acrospires, and an alpha-amylase content of at least 15 units per gram, based on the dry weight of the cleaned product. Alpha-amylase values in excess of 100 units per gram may be provided. Other very favorable malt analytical values may be achieved if desired, including diastatic power, protein ratio, fine grind extract, and fine-coarse difference. The product has a greater density than malt, averaging about 43 pounds per bushel for barley based on an initial barley weight of 48 pounds per bushel, dry basis, as compared to a weight of less than 40 pounds per bushel for barley malt.

The following examples illustrate grain modification employing low temperature to render the radicles and acrospires inviable, and the production of the new grain product. The invention is not limited to these examples, nor to the conditions, proportions and procedures set forth therein, which are merely illustrative. Unless otherwise indicated, the initial material was whole grain, i.e., as received from storage following harvesting and with the husk remaining thereon. The malt analytical values set forth as indices of modification include alpha-amylase, which is also a measure of the dextrinizing power of the grain product. The raw grains exhibit no measurable initial content of alpha-amylase. Diastatic power is a measure of the dextrinizing and saccharifying power of the product, attributed to alpha-amylase and beta-amylase. Fine grind extract is a measure of the proportion of the grain which is available for processing following extraction and filtration. Fine-coarse difference and ratio of soluble to total protein are indices of modification. Improved modification is associated with higher alpha-amylase, higher diastatic power, higher fine grind extract, higher soluble to total protein ratio, and lower fine-coarse difference. These analytical values were determined and are set forth in the examples according to A.S.B.C. procedures, as identified above, for the dried and cleaned grain modification product obtained upon incubation, on a dry basis. Recovery is likewise based on dried and cleaned grain following incubation, and culms are based on material separated from the grain in cleaning, as compared to the starting whole grain, on a dry basis. All proportions are by weight.

*Example 1*

Whole grain barley (Kindred variety) was steeped in water at 50° F. for 32 hours, to provide a grain moisture content of 40.6%. The moist barley was separated from the liquid and maintained at 0° F. for 24 hours. The grain was thawed, and 500 gram portions were separated for modification. Each portion was sprayed with 25 grams of water (as a control) or with water containing a gibberellic acid compound (G.A.) in a concentration of 10 or 20 p.p.m., to provide a concentration on the grain as indicated below. In this case, the gibberellic acid compound was potassium gibberellate. The resulting grain moisture was 43%.

The portions were incubated in cans in the manner of drum malting, with air circulated at 54° F. and substantially saturated with moisture. After three days incubation, 25 gram quantities of water were added to the grain portions to bring the moisture content to 45%. The grain was incubated for a total of five days.

The product of incubation was dried or kilned by circulating hot air therethrough, following the schedule: 7.5 hours at 120° F.; 0.5 hour from 120 to 130 degrees F.; 8 hours at 130° F.; 0.5 hour from 130 to 140 degrees F.; and 3 hours at 140° F. The dried product was cleaned and analyzed, with the following results:

| | Control | 0.5 p.p.m. G.A. | 1.0 p.p.m. G.A. |
|---|---|---|---|
| Fine Grind Extract, Percent | 67.7 | 76.2 | 76.3 |
| Fine-Coarse Difference, Percent | 7.8 | 3.0 | 2.4 |
| Diastatic Power, ° Lintner/g | 132 | 190 | 207 |
| Alpha-Amylase, D.U./g | None | 21.1 | 19.9 |
| Ratio of Soluble to Total Protein, Percent | 23.5 | 46.2 | 47.8 |
| Culms, Percent | 0.13 | 0.06 | 0.13 |
| Recovery, Percent | 97.87 | 97.39 | 97.21 |

It will be seen that the treatment resulted in high recoveries. The control exhibited no production of alpha-amylase, whereas the grain contacted with gibberellic acid compound exhibited alpha-amylase production and other favorable modification values.

The above relatively low temperature kilning conditions are designed to preserve maximum enzyme activity. A product intended for use in the manner of a brewers malt is kilned at the following schedule: 8.5 hours at 120° F.; 0.5 hour from 120 to 130 degrees F.; 7 hours at 130° F.; 1 hour from 130 to 150 degrees F.; 3 hours at 150° F.; 1 hour from 150 to 180 degrees F.; and 4 hours at 180° F.

*Example 2*

A quantity of whole grain Kindred barley was subdivided for different steep treatments. One portion was steeped at 50° F. for 24 hours, to provide 36% moisture therein. Another portion was steeped at 50° F. for 32 hours, to provide 39% moisture. The grain was frozen, thawed, and sprayed with water or with aqueous potassium gibberellate in the substantially same manner as in Example 1. The grain was incubated as in Example 1, for five days at 65° F., adding 25 grams of water to each portion after three days incubation. The grain modification product was dried and analyzed as in Example 1, with the following results:

| | 36% Moisture | | |
|---|---|---|---|
| | Control | 0.25 p.p.m. G.A. | 1.0 p.p.m. G.A. |
| Fine Grind Extract, Percent | 67.3 | 76.4 | 78.3 |
| Fine-Coarse Difference, Percent | 8.7 | 3.9 | 3.1 |
| Diastatic Power, ° Lintner/g | 110 | 171 | 176 |
| Alpha-Amylase, D.U./g | None | 17.7 | 32.1 |
| Ratio of Soluble to Total Protein, Percent | 22.6 | 42.1 | 49.3 |
| Culms, Percent | 0.21 | 0.31 | 0.44 |
| Recovery, Percent | 96.69 | 95.62 | 95.43 |

| | 39% Moisture | | |
|---|---|---|---|
| | Control | 0.25 p.p.m. G.A. | 1.0 p.p.m. G.A. |
| Fine Grind Extract, percent | 66.9 | 76.5 | 77.0 |
| Fine-Coarse Difference, percent | 9.0 | 4.6 | 3.6 |
| Diastatic Power, ° Lintner/g | 128 | 174 | 181 |
| Alpha-Amylase, D.U./g | None | 17.7 | 19.3 |
| Ratio of Soluble to Total Protein, percent | 16.1 | 43.3 | 44.8 |
| Culms, percent | 0.25 | 0.31 | 0.37 |
| Recovery, percent | 96.46 | 94.73 | 95.30 |

Example 3

Whole grain Kindred barley was subdivided and steeped in water at 50° F. One portion was steeped for 29 hours, to produce a moisture content of 39%. A second portion was steeped for 40 hours to produce a moisture content of 41.5%. The procedure of Example 1 was repeated, except that the incubation temperature was 72° F. The frozen materials were compared with grain steeped in the same manner and neither frozen nor contacted with gibberellic acid compound. The incubation treatment of the non-frozen grain resulted in germination as in conventional malting practice, and such germinated grain exhibited normal growth, i.e., emergence of the radicle and rootlet growth, and emergence of the contacted with gibberellic acid compound. The incubative results obtained on dry incubation products were as follows:

|  | 39% Moisture | | |
| --- | --- | --- | --- |
|  | Non-Frozen | Frozen | |
|  |  | Control | 1.0 p.p.m. G.A. |
| Fine Grind Extract, percent | 75.0 | 69.4 | 77.4 |
| Fine-Coarse Difference, percent | 3.5 | 8.2 | 2.3 |
| Diastatic Power,° Lintner/g | 168 | 123 | 193 |
| Alpha-Amylase, D.U./g | 41.3 | None | 37.2 |
| Ratio of Soluble to Total Protein, percent | 34.3 | 30.8 | 26.8 |
| Culms, percent | 5.84 | 0.12 | 0.25 |
| Recovery, percent | 88.34 | 96.43 | 93.45 |

|  | 41.5% Moisture | | |
| --- | --- | --- | --- |
|  | Non-Frozen | Frozen | |
|  |  | Control | 1.0 p.p.m. G.A. |
| Fine Grind Extract, percent | 75.5 | 70.4 | 78.9 |
| Fine-Coarse Difference, percent | 3.8 | 10.3 | 1.5 |
| Diastatic Power,° Lintner/g | 177 | 127 | 200 |
| Alpha-Amylase, D.U./g | 38.2 | None | 19.8 |
| Ratio of Soluble to Total Protein, percent | 34.4 | 28.8 | 53.4 |
| Culms, percent | 6.71 | 0.25 | 0.50 |
| Recovery, percent | 87.19 | 95.81 | 93.31 |

It will be seen that the recoveries for the frozen materials were substantially higher. The analytical values of the frozen material compared favorably with the non-frozen material, in several instances representing improved results.

Example 4

Kindred barley was dehusked by immersion in 50% $H_2SO_4$ for 3 hours. The whole corns were separated from the husks, washed, and steeped in water for 24 hours at 54° F., to produce a moisture content of 43.9%. The moist grain was separated, maintained at 0° F. for 24 hours, and thawed. Water (as a control) or 10 p.p.m. aqueous potassium gibberellate solution was added to provide a moisture content of 47%. The grain was incubated at one of several temperatures for three days, in petri dishes containing a filter pad saturated with 4 grams of water (control) or the 10 p.p.m. gibberellate solution. The total gibberellate concentration provided in the grain contact therewith was 1 p.p.m. The results were as follows:

| Incubation Temperature, °F. | Treatment | Alpha-Amylase, D.U./g. |
| --- | --- | --- |
| 34 | Control | None |
|  | G.A. | None |
| 52 | Control | None |
|  | G.A. | 24.0 |
| 74 | Control | None |
|  | G.A. | 108.7 |

The most favorable temperature was 74° F., while no alpha-amylase production occured at 34° F. under these conditions.

Example 5

Hard red winter wheat, Racine variety, was steeped in water for 30 hours at 54° F., to produce a moisture content of 39.4%. The moist grain was separated from the liquor, maintained at 0° F. for 42 hours, and then thawed. The grain was sprayed with 25 grams of water or water containing potassium gibberellate in a concentration of 10 or 100 p.p.m. The grain was incubated at 54° F. for five days in petri dishes containing filter pads saturated with water or the corresponding gibberellate solution, to provide the indicated concentrations on the grain. The dried grain was analyzed, with the following results.

Treatment: Alpha-amylase, D.U./g.
Control _____ None
1.0 p.p.m. G.A. _____ 52.6
10 p.p.m. G.A. _____ 51.6

Example 6

Rye was steeped in water for 28 hours at 54° F. to produce a moisture content of 37.1%. The moist grain was separated from the liquor, maintained at 0° F. for 22 hours, and thawed. The grain was immersed for 5 minutes in either water or aqueous sodium gibberellate of 10 p.p.m. or 100 p.p.m. concentration. The grain was incubated at 74° F. for three days in petri dishes containing paper filter pads saturated with water or the corresponding gibberellate solution, to provide the indicated concentrations on the grain. The dried grain was analyzed, with the following results.

Treatment: Alpha-amylase, D.U./g.
No G.A. _____ 40.2
1 p.p.m. G.A. _____ 59.1
10 p.p.m. G.A. _____ 64.9

The results demonstrate that rye having inviable embryonic radicles and acrospires is capable of modification with the production of appreciable quantities of alpha-amylase when subjected to enzyme-producing conditions. A gibberellic acid compound present under such conditions stimulates substantially increased enzyme production.

The invention thus provides a new grain modification process, and a new grain product containing amylolytic and other enzymes, and enzymatic hydrolysis products of the grain food materials. Modification is achieved with high recoveries, and particularly, without the losses which are characteristic of malting. The new process is substantially simpler and more versatile than malting, is subject to accurate control, and requires no additives other than the gibberellic acid compound.

We claim:
1. In a process for producing a malt-like grain modification product from malting cereal grain whole corns having a viable embryonic radicle and acrospire content and active endosperms, the improvement which comprises subjecting said grain whole corns to freezing temperature and moisture conditions sufficient to render the radicles and acrospires inviable while preserving endosperm activity prior to grain modification.

2. A process as defined in claim 1 wherein said grain is selected from the group consisting of barley, wheat, oats, and rye.

3. A process as defined in claim 2 wherein the temperature of said grain whole corns is lowered to 0° F. in subjecting them to said freezing temperature conditions.

4. A process as defined in claim 2 wherein said grain whole corns thereafter are modified in contact with an added compound of gibberellic acid.

5. The process for producing a malt-like grain modification product from malting cereal grain whole corns having a viable embryonic radicle and acrospire content and active endosperms which comprises subjecting said grain whole corns to freezing temperature and moisture conditions sufficient to render the radicles and acrospires inviable while preserving endosperm activity, and subjecting said grain whole corns to enzyme-producing conditions until a substantial amount of alpha-amylase is produced.

6. A process as defined in claim 5 wherein said grain is selected from the group consisting of barley, wheat, oats, and rye.

7. A process as defined in claim 6 wherein the temperature of said grain whole corns is lowered to 0° F. in subjecting them to said freezing temperature conditions.

8. A process as defined in claim 7 wherein said grain whole corns subjected to freezing temperature conditions have a moisture content of about 30% to 45% by weight.

9. A process as defined in claim 7 wherein said grain whole corns are contacted with an added compound of gibberellic acid under said enzyme-producing conditions.

10. The process for producing a malt-like grain modification product from malting cereal grain whole corns having a viable embryonic radicle and acrospire content and active endosperms which comprises subjecting said grain whole corns to freezing temperature and moisture conditions sufficient to render the radicles and acrospires inviable while preserving endosperm activity, and contacting said grain whole corns with an added compound of gibberellic acid under enzyme-producing conditions until a substantial amount of alpha-amylase is produced.

11. A process as defined in claim 10 wherein said grain is selected from the group consisting of barley, wheat, oats, and rye.

12. A process as defined in claim 11 wherein said grain whole corns are contacted under said enzyme-producing conditions with added gibberellic acid, an alkali metal salt of gibberellic acid, or an alkaline earth metal salt of gibberellic acid in an amount providing a concentration of about 0.1 to 100 parts per million on the grain.

13. A process as defined in claim 12 wherein said grain whole corns are subjected to enzyme-producing conditions until aplha-amylase is produced in an amount of at least 15 units per gram on a dry basis.

14. A process as defined in claim 13 wherein said grain whole corns are subjected to enzyme-producing conditions until the product has a diastatic power of at least 40° Lintner per gram on a dry basis.

15. In a process for modification of barley grain, the improvement which comprises steeping grain whole corns having a viable embryonic radicle and acrospire content and active endosperms to provide a moisture content of about 30 to 45% by weight, subjecting the steeped whole corns to freezing temperature conditions sufficient to render the radicles and acrospires inviable while preserving endosperm activity, adding to the whole corns about 0.1 to 100 parts per million of a compound selected from the group consisting of gibberellic acid and its alkali metal and alkaline earth metal salts, and subjecting the thus-treated whole corns to enzyme-producing conditions until alpha-amylase is produced in an amount of at least 15 units per gram on a dry basis.

16. A grain product which comprises malt-like modified malting cereal grain whole corns having inviable embryonic radicles and acrospires, and an alpha-amylase content of at least 15 units per gram on a dry basis.

17. A grain product which comprises malt-like modified malting cereal grain whole corns having inviable embryonic radicles and acrospires, an alpha-amylase content of at least 15 units per gram, and a diastatic power of at least 40° Linter per gram, on a dry basis.

18. A grain product which comprises malt-like modified barley whole corns having inviable embryonic radicles and acrospires, and an alpha-amylase content of at least 15 units per gram, on a dry basis.

19. A grain product which comprises malt-like modified barley whole corns having inviable embryonic radicles and acrospires, an alpha-amylase content of at least 15 units per gram, and a diastatic power of at least 40° Lintner per gram, on a dry basis.

20. A grain product which comprises malt-like modified wheat whole corns having inviable embryonic radicles and acrospires, and an alpha-amylase content of at least 15 units per gram on a dry basis.

21. A grain product which comprises malt-like modified rye whole corns having inviable embryonic radicles and acrospires, and an alpha-amylase content of at least 15 units per gram on a dry basis.

22. A husk-containing whole grain malt-like barley modification product suitable for brewing and consisting essentially of small, dense, compact barley grains with tightly adherent husks, having inviable embryonic radicles and acrospires, and wherein the endosperms are partially hydrolyzed and the enzyme system is developed to provide an alpha-amylase content of at least 15 units per gram and a diastatic power of at least 40° Lintner per gram, on a dry basis.

23. In a process for modification of barley grain, the improvement which comprises steeping grain whole corns having a viable embryonic radicle and acrospire content and active endosperms to provide a moisture content of about 30 to 45% by weight, subjecting the steeped whole corns to a temperature on the order of 0° F. to render the radicles and acrospires inviable while preserving endosperm activity, adding to the whole corns about 0.1 to 100 parts per million of a compound selected from the group consisting of gibberellic acid and its alkali metal and alkaline earth metal salts, and incubating the thus-treated whole corns for about 3 to 7 days at a temperature of about 50–75° F. and at a grain moisture content of about 35–50% by weight to produce at least 15 units of alpha-amylase per gram on a dry basis.

References Cited by the Examiner

UNITED STATES PATENTS

| 3,085,945 | 4/1963 | Luchsinger et al. | 195—69 |
| 3,104,207 | 9/1963 | Brian et al. | 195—70 |
| 3,116,221 | 12/1963 | Sfat et al. | 195—70 |
| 3,149,053 | 9/1964 | Kneen et al. | 195—70 |
| 3,158,551 | 11/1964 | Macey et al. | 195—70 |

FOREIGN PATENTS

| 24,548 | 1893 | Great Britain. |

A. LOUIS MONACELL, *Primary Examiner.*

D. M. STEPHENS, M. GREENSTEIN,
*Assistant Examiners.*